(12) United States Patent
Mizuno et al.

(10) Patent No.: US 11,370,413 B2
(45) Date of Patent: Jun. 28, 2022

(54) CONTROL SYSTEM FOR HYBRID VEHICLE

(71) Applicant: TOYOTA JIDOSHA KABUSHIKI KAISHA, Toyota (JP)

(72) Inventors: Junya Mizuno, Shizuoka-ken (JP); Hideo Watanabe, Toyota (JP); Toshiyuki Tomita, Susono (JP); Masami Kondo, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 16/722,307

(22) Filed: Dec. 20, 2019

(65) Prior Publication Data

US 2020/0207330 A1 Jul. 2, 2020

(30) Foreign Application Priority Data

Dec. 27, 2018 (JP) .............................. JP2018-244068

(51) Int. Cl.
*B60W 20/40* (2016.01)
*B60W 10/02* (2006.01)
*F16D 7/02* (2006.01)

(52) U.S. Cl.
CPC ............ *B60W 20/40* (2013.01); *B60W 10/02* (2013.01); *F16D 7/02* (2013.01); *B60W 2510/025* (2013.01); *B60W 2710/026* (2013.01)

(58) Field of Classification Search
CPC ......... B60W 2510/02; B60W 2710/02; B60W 10/02; B60W 20/40
See application file for complete search history.

(56) References Cited

U.S. PATENT DOCUMENTS

| | | | | |
|---|---|---|---|---|
| 2005/0277515 A1* | 12/2005 | Tanaka | .................... | F16D 48/08 477/156 |
| 2006/0040788 A1* | 2/2006 | Bassler | ................. | F16D 48/062 477/71 |
| 2013/0218394 A1 | 8/2013 | Kanayama et al. | | |
| 2018/0312156 A1* | 11/2018 | Yoon | .................... | B60W 20/10 |

FOREIGN PATENT DOCUMENTS

| | | |
|---|---|---|
| JP | 2005-351357 A | 12/2005 |
| WO | 2012/059996 A1 | 5/2012 |

* cited by examiner

*Primary Examiner* — Stacey A Fluhart
(74) *Attorney, Agent, or Firm* — Sughrue Mion, PLLC

(57) ABSTRACT

A control system for a hybrid vehicle configured to limit a thermal damage to a starting clutch without generating a shock. The control system is applied to a vehicle in which a prime mover includes an engine, a first motor, and a second motor. In the vehicle, the first motor is connected to the engine, and a first clutch and a second clutch are disposed between the engine and drive wheels. A controller executes a transient slip control to cause the second clutch to slip while bringing the slipping first clutch into complete engagement if a temperature of the first clutch is high. If an engine speed is changed during execution of the transient slip control, the first motor generates a collection torque to suppress the change in the engine speed.

4 Claims, 8 Drawing Sheets

CONTROL SYSTEM FOR HYBRID VEHICLE

CROSS REFERENCE TO RELATED APPLICATIONS

The present disclosure claims the benefit of Japanese Patent Application No. 2018-244068 filed on Dec. 27, 2018 with the Japanese Patent Office, the disclosure of which are incorporated herein by reference in its entirety.

BACKGROUND

Field of the Disclosure

Embodiments of the present disclosure relate to the art of a control system for a hybrid vehicle in which a prime mover includes an engine and a motor, and in which an output torque of the engine is transmitted through a friction clutch as a starting clutch.

Discussion of the Related Art

In conventional vehicles having an automatic transmission to transmit power of an engine to drive wheels, a torque converter has been used to launch the vehicle. Instead, in recent years, a friction clutch has also been used to launch the vehicle quickly and to improve power transmission efficiency. One example of such vehicle having the starting clutch is described in PCT publication WO2012/059996.

The hybrid vehicle taught by WO2012/059996 comprises an engine, a first motor, a clutch, and a second motor. The first motor is connected to the engine. The clutch provides a connection and disconnection in a power transmission path between drive wheels and each of the engine and the first motor. The second motor is connected to the drive wheels in a power transmittable manner. The hybrid vehicle can run in at least two modes including an electric vehicle (EV) running mode and a parallel hybrid vehicle (HV) running mode. The hybrid vehicle running in the EV running mode is powered by the second motor, with the clutch disengaged to disconnect the engine from the power transmission path. The hybrid vehicle running in the parallel HV running mode is powered by the engine and at least one of the first motor and the second motor, with the clutch engaged to connect the power transmission path to the engine. In the vehicle taught by WO 2012/059996, the starting clutch is employed instead of the torque converter, and the starting clutch is allowed to be engaged partially while causing a slip.

US 2005/277515 A1 describes a starting device for motor vehicles configured to limit thermal damage on a friction element including a forward friction element and a reverse brake. In the vehicle described in US 2005/277515 A1, the forward friction element is engaged when propelling the vehicle in the forward direction to deliver a torque from an input rotary member to an output rotary member, and the reverse brake is engaged when reversing the vehicle to halt a predetermined rotary member. According to the teachings of US 2005/277515 A1, when the heat of the forward friction element is raised higher than a predetermined level, the forward friction element is engaged completely and the reverse brake is engaged partially while causing a slip.

In the hybrid vehicle described in WO2012/059996, a forward/backward switching device and an automatic transmission are disposed between: the engine and the first motor; and the clutch. The forward/backward switching device includes a forward clutch that is engaged during forward propulsion and a reverse brake that is engaged during backward propulsion. That is, in the hybrid vehicle described in WO2012/059996, power transmission between: the engine and the first motor; and the clutch is interrupted by releasing both the forward clutch and the reverse brake. Therefore, an overheating and a thermal damage on the clutch used as a starting clutch of the vehicle disclosed in WO2012/059996 may be prevented by applying the teachings of US 2005/277515 A1. In this case, when the heat of the starting clutch of the vehicle disclosed in WO2012/059996 causing a slip exceeds a predetermined value, the starting clutch may be engaged completely and the forward clutch or reverse brake of the forward/backward switching device may be engaged partially while causing a slip. Consequently, the slip of the starting clutch may be terminated earlier to suppress heat generation of the starting clutch.

However, the forward clutch and the reverse brake of the forward/backward switching device described in WO2012/059996, and the forward friction element and the reverse brake described in US 2005/277515 A1 are actuated hydraulically. Therefore, a response delay of those engagement devices may be caused inevitably. For this reason, a timing of switching engagement states of the clutches may be shifted undesirably, and actuation amounts of the of the clutches may be changed undesirably.

For example, when engaging the starting clutch in slip engagement completely while causing another clutch (e.g., an AT clutch) in complete engagement to slip as indicated in FIG. 1, an actual torque of the starting clutch represented by the dashed-dotted line may fall below a theoretical torque of the starting clutch represented by the solid line as indicated between points t1 and t2. In this situation, a rotational speed of the prime mover (including the engine and the first motor) applying torque to the starting clutch is raised abruptly and an acceleration of the vehicle is reduced temporarily.

By contrast, when engaging the starting clutch in slip engagement completely while causing the AT clutch in complete engagement to slip as indicated in FIG. 2, the actual torque of the starting clutch represented by the dashed-dotted line may exceed the theoretical torque of the starting clutch represented by the solid line as indicated between points t3 and t4. In this situation, the rotational speed of the prime mover drops temporarily and the acceleration of the vehicle is increased temporarily.

Thus, according to the conventional art, a timing of switching engagement states of the clutches may be shifted undesirably and actuation amounts of the of the clutches may be changed undesirably due to response delay of the hydraulically actuated clutches, during execution of so-called a "transient slip control". For this reason, a rotational speed of the prime mover and an acceleration of the vehicle may be changed temporarily thereby causing a shock. In addition, a driver may feel uncomfortable feeling.

SUMMARY

Aspects of embodiments of the present disclosure have been conceived noting the foregoing technical problems, and it is therefore an object of the present disclosure to provide a control system for a hybrid vehicle configured to limit a thermal damage to a starting clutch without generating a shock.

The control system according to the exemplary embodiment of the present disclosure is applied to the hybrid vehicle, comprising: an engine; a first motor that is connected to an output shaft of the engine in a power transmittable manner; a first clutch that selectively transmits power from the engine and the first motor to a pair of drive wheels, and that is adapted to be engaged partially while slipping to vary a torque transmitting capacity continuously; a second clutch that selectively transmits the power from the engine and the first motor to the pair of drive wheels, and that is adapted to be engaged partially while slipping to vary a torque transmitting capacity continuously; a second motor that is connected to the pair of drive wheels without interposing the engine and the first motor therebetween; a detector that collects at least data relating to a heat of the first clutch, and a speed of the engine; and a controller that controls the engine, the first clutch, the second clutch, the first motor, and the second motor. The controller is configured to: obtain a temperature of the first clutch based on the data relating to the heat of the first clutch when engaging the first clutch completely while causing the first clutch to slip; execute a transient slip control to cause the second clutch to slip while bringing the slipping first clutch into complete engagement if the temperature of the first clutch is higher than a predetermined level; and generate a collection torque to suppress a change in a speed of the engine by the first motor, if the speed of the engine is changed from a target speed more than a predetermined value during execution of the transient slip control.

In a non-limiting embodiment, the controller may be further configured to operate the second motor to generate a torque counteracting against the collection torque generated by the first motor.

In a non-limiting embodiment, the controller may be further configured to execute the transient slip control in such a manner that the torque transmitting capacity of the first clutch is increased with respect to an ideal torque transmitting capacity of the first clutch given that the first clutch is engaged partially in an ideal condition in which the speed of the engine will not be changed.

In a non-limiting embodiment, the controller may be further configured to: execute a friction start to launch the hybrid vehicle by delivering at least an output torque of the engine gradually to the pair of drive wheels while causing the first clutch or the second clutch to slip; execute the transient slip control if the temperature of the first clutch is raised higher than the predetermined level during execution of the friction start; and continue the friction start while causing the second clutch to slip after engaging the first clutch completely.

Thus, according to the exemplary embodiment of the present disclosure, the transient slip control is executed to prevent an overheating of the first clutch engaged partially to launch the hybrid vehicle, when the temperature of the first clutch reaches the predetermined level. In this situation, if the speed of the engine is changed undesirably as a result of executing the transient slip control, the speed of the engine is corrected by controlling the correction torque of the first motor by a feedback method. For example, in the case that the speed of the engine is raised temporarily as indicated in FIG. 1, such rise in the speed of the engine is suppressed by generating a negative correction torque by the first motor. By contrast, in the case that the speed of the engine is reduced temporarily as indicated in FIG. 1, such reduction in the speed of the engine is suppressed by generating a positive correction torque by the first motor. According to the exemplary embodiment of the present disclosure, the thermal damage to the first clutch may be limited when launching the hybrid vehicle, and the hybrid vehicle may be launched smoothly without generating shocks.

During execution of the transient slip control, drive force to propel the hybrid vehicle and acceleration of the hybrid vehicle may be changed as a result of correcting the speed of the engine by the correction torque of the first motor during execution of the transient slip control of the clutches. In order to suppress such change in the drive force and the acceleration, according to the exemplary embodiment of the present disclosure, the second motor generates the counter torque against the correction torque of the first motor. According to the exemplary embodiment of the present disclosure, therefore, overheating of the first clutch may be prevented when launching the hybrid vehicle, and the hybrid vehicle is allowed to launch smoothly without shock. In other words, the first clutch can be protected while improving driving comfort when launching the hybrid vehicle.

The second motor is mainly used under high load to launch and accelerate the hybrid vehicle by generating the positive torque, therefore, the positive torque of the second motor may be restricted when reaches an upper limit. However, the second motor is allowed to generate the negative torque without restriction to counteract to the positive correction torque of the first motor. Therefore, the controller executes the transient slip control in such a manner that the torque transmitting capacity of the first clutch is increased with respect to the ideal torque transmitting capacity. In this case, as indicated in FIG. 2, the speed of the engine is reduced from the target speed during execution of the transient slip control. Consequently, the second motor is allowed to generate the counter torque in the negative direction to counter act to the positive correction torque generated by the first motor. In this case, therefore, change in the drive force to propel the hybrid vehicle and change in the acceleration of the hybrid vehicle resulting from correcting the speed of the engine by the first motor may be suppressed certainly by generating the negative torque by the second motor without restriction. For this reason, the thermal damage to the first clutch may be limited without shock.

In addition, after engaging the first clutch completely during execution of the friction start, the controller continues the friction start by causing the second clutch to slip. According to the exemplary embodiment of the present disclosure, therefore, the hybrid vehicle is allowed to be launched smoothly by the friction start without damaging the first clutch.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

Figure 3:
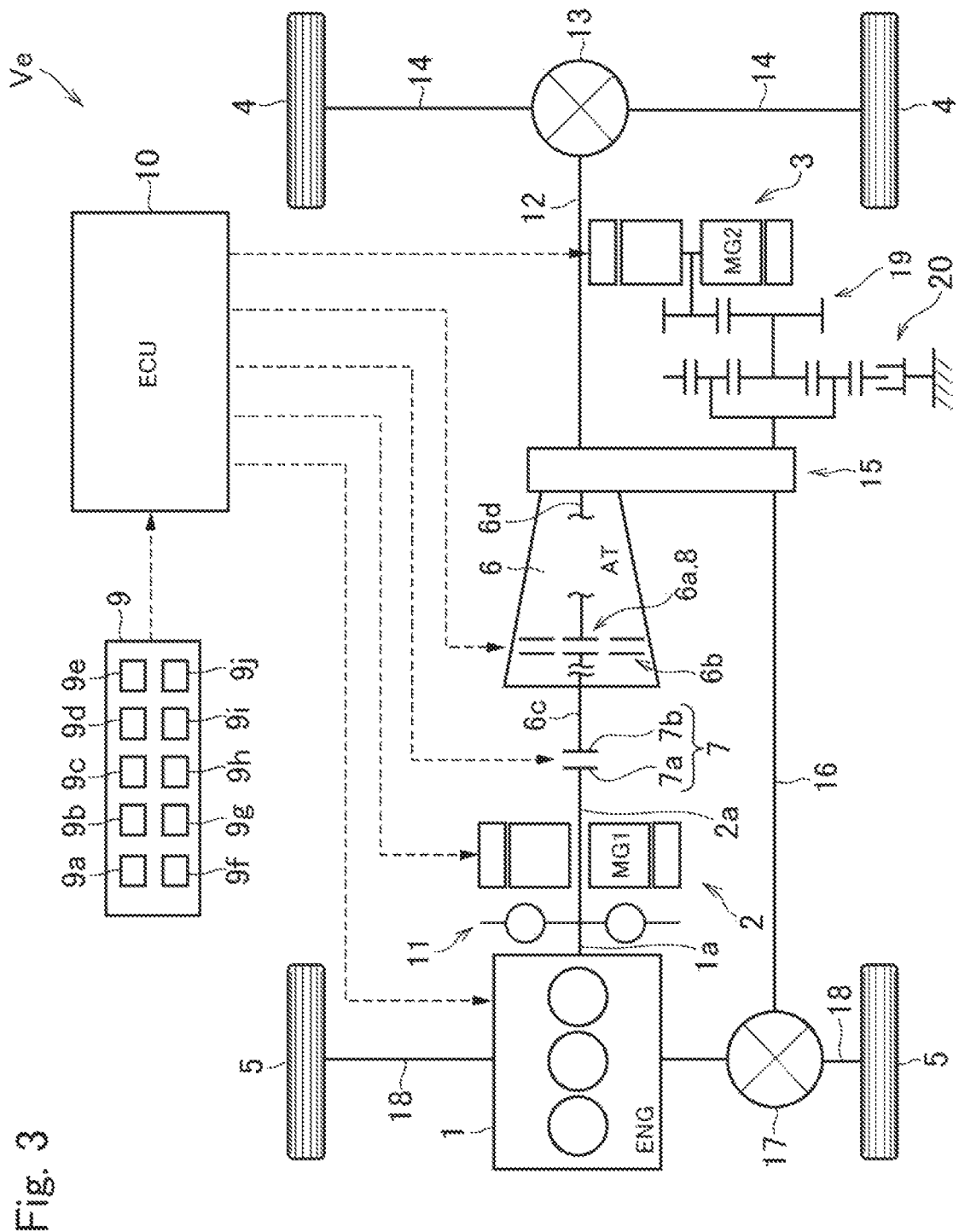
FIG. 3 is a schematic illustration showing one example of a structure of the hybrid vehicle to which the control system according to the present disclosure is applied.

Referring now to FIG. 3, there is shown one example of a drive system and a control system of a hybrid vehicle (as will be simply called the "vehicle" hereinafter) Ve to which the control system according to the embodiment of the present disclosure is applied. A prime mover of the vehicle Ve includes an engine 1 (referred to as "ENG" in FIG. 3), a first motor (referred to as "MG1" in FIG. 3) 2, and a second motor (referred to as "MG2" in FIG. 3) 3. In the vehicle Ve, the first motor 2 is connected to the engine 1 so that an output torque of the first motor 2 is delivered to a pair of front wheels 5 and a pair of rear wheels 4 through an automatic transmission (referred to as "AT" in FIG. 3) 6. An output torque of the second motor 3 is delivered directly to the front wheels 5 and the rear wheels 4 without passing through the automatic transmission (as will be simply called the "transmission" hereinafter) 6. In the vehicle Ve, at least two frictional engagement devices such as a first clutch and a second clutch are disposed between the engine 1 and the drive wheels.

In order to avoid overheating of the first clutch and the second clutch, the control system according to the exemplary embodiment of the present disclosure is configured to execute a so-called "transient slip control" of the first clutch that is engaged firstly while slipping, and the second clutch that is engaged secondly while slipping. To this end, the vehicle Ve is provided with an electronic control unit (as will be called the "controller" hereinafter) 10 that controls the prime mover and the clutches, and a detector 9 that collect data relating to the vehicle Ve.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The first motor 2 is disposed coaxially with the engine 1, and in the example shown in FIG. 3, a rotary shaft (i.e., a rotor shaft) 2a of the first motor 2 is connected to an output shaft 1a of the engine 1 through a damper device 11. The first motor 2 serves not only as a motor to generate torque when driven by electricity suppled thereto, but also as a generator to generate electricity when driven by torque of the engine 1. That is, the first motor 2 is a motor-generator. For example, a permanent magnet type synchronous motor, and an induction motor may be adopted as the first motor 2. The first motor 2 is connected to a battery through an inverter (neither of which are shown) so that the electricity generated by the first motor 2 can be accumulated in the battery. The first motor 2 may be operated as a motor to generate torque by supplying the electricity to the first motor 2 from the battery. The output torques of the engine 1 and the first motor 2 is delivered to the pair of front wheels 5 serving as drive wheels in the vehicle Ve shown in FIG. 3 via a clutch 7, the transmission 6 and so on.

The second motor 3 is connected to the front wheels 5 in a power transmittable manner. The second motor 3 serves not only as a motor to generate torque when driven by electricity suppled thereto, but also as a generator to generate electricity when driven by torque applied thereto from an external source. Thus, the second motor 3 is also a motor-generator. For example, a permanent magnet type synchronous motor, and an induction motor may also be adopted as the second motor 3. The second motor 3 is also connected to the battery through the inverter. Specifically, the second motor 3 may be operated as a motor to generate torque by supplying electricity to the second motor 3 from the battery, and may also be driven as a generator by torque transmitted thereto from the front wheels 5. The electricity generated by the second motor 3 may be accumulated in the battery. The first motor 2 and the second motor 3 are connected to each other through the inverter so that the electricity is exchanged therebetween. For example, the second motor 3 may also be allowed to generate torque by directly supplying electricity generated by the first motor 2. The output torque of the second motor 3 is delivered to the pair of front wheels 5 without passing through a power transmission route between the engine 1 and the pair of rear wheels 4. Thus, the second motor 3 is connected to the pair of front wheels 5 without interposing the engine 1 and the first motor 2 therebetween.

The rear wheels 4 are driven by the output torque of the prime mover to generate a drive force to propel the vehicle Ve. To this end, in the vehicle Ve shown in FIG. 3, the rear wheels 4 are connected to the engine 1 and the first motor 2 through the clutch 7, the transmission 6, a rear propeller shaft 12, a rear differential gear unit 13, and rear driveshafts 14.

The vehicle Ve shown in FIG. 3 is a four-wheel drive layout (i.e., an all-wheel drive layout) vehicle in which the drive torque is delivered to both pairs of the front wheels 5 and the rear wheels 4 to propel the vehicle Ve. That is, the front wheels 5 are also driven by the drive torque generated by the prime mover. To this end, in the vehicle Ve shown in FIG. 3, the front wheels 5 are connected to the engine 1 and the first motor 2 through the clutch 7, the transmission 6, a transfer 15, a front propeller shaft 16, a front differential gear unit 17, and front driveshafts 18. The front wheels 5 are connected to the second motor 3 also serving as a prime mover through a reduction gear 19, a speed reducing mechanism 20, the front propeller shaft 16, the front differential gear unit 17, and the front driveshafts 18.

The transmission 6 is disposed on the output side of the first motor 2 to transmit torques of the engine 1 and the first motor 2 to the rear wheels 4. The transmission 6 is adapted to change a ratio of a speed of an input shaft to a speed of an output shaft arbitrarily. For example, an automatic transmission such as a geared transmission and a continuously variable transmission may be adopted as the transmission 6.

The transmission 6 is provided with a plurality of frictional engagement devices so that the transmission 6 is allowed to transmit torque by engaging at least one of the frictional engagement devices and brought into a neutral stage by disengaging both of the frictional engagement devices. Specifically, a friction clutch is adopted as each of the frictional engagement devices of the transmission 6. The friction clutch may be engaged partially while slipping so as to vary a torque transmitting capacity continuously. In FIG. 3, only one frictional engagement device 6a is depicted in the transmission 6 for the sake of illustration. In the vehicle Ve shown in FIG. 3, the frictional engagement device 6a of the transmission 6 serves as an after-mentioned clutch 8 corresponding to the "second clutch" of the embodiment.

According to the embodiment of the present disclosure, any one of the frictional engagement devices of the transmission 6 may also serve as a starting clutch corresponding to the "first clutch", and the clutch 7 may also serve as the "second clutch". Specifically, although not especially shown in FIG. 3, the frictional engagement device 6a is a multiple plate clutch comprising a plurality of input engagement elements and a plurality of output engagement elements arranged alternately.

A power transmission from the engine 1 and the first motor 2 to the rear wheels 4 is interrupted by disengaging at least one of the frictional engagement devices of the transmission 6, and a predetermined gear stage is established in the transmission 6 by engaging any two of the frictional engagement devices to transmit output powers of the engine 1 and the first motor 2 through the transmission 6.

The power transmission between the engine 1 and the rear wheels 4 is also interrupted by disengaging the clutch 7. In the vehicle Ve shown in FIG. 3, specifically, the clutch 7 is disposed between the first motor 2 and the transmission 6 to serve as a starting clutch that transmits an output torque of the engine 1 to the rear wheels 4 when launching the vehicle Ve. The clutch 7 may also be engaged partially while slipping so as to vary a torque transmitting capacity continuously. In the vehicle Ve shown in FIG. 3, therefore, the clutch 7 serves as the "first clutch".

The clutch 7 comprises an input engagement element 7a and an output engagement element 7b, and the clutch 7 is engaged by frictionally mating the input engagement element 7a and the output engagement element 7b to each other. Specifically, the input engagement element 7a is connected to the output shaft 1a of the engine 1 through the rotor shaft 2a of the first motor 2, and the output engagement element 7b is connected to an input shaft 6c of the transmission 6. That is, the engine 1 and the first motor 2 are disconnected from a powertrain to deliver the drive torque to the rear wheels 4 by disengaging the input engagement element 7a and the output engagement element 7b of the clutch 7 from each other. By contrast, the engine 1 and the first motor 2 are connected to the powertrain to deliver the drive torque to the rear wheels 4 by engaging the input engagement element 7a and the output engagement element 7b of the clutch 7 to each other. Although not especially shown in FIG. 3, a multiple plate clutch comprising a plurality of input engagement elements 7a and a plurality of output engagement elements 7b arranged alternately may also be adopted as the clutch 7.

Thus, in the vehicle Ve shown in FIG. 3, the clutch 7 serves as the starting clutch. Therefore, the vehicle Ve shown in FIG. 3 can be launched smoothly by delivering the output torque of the engine 1 to the rear wheels 4 while causing the clutch 7 to slip thereby varying a torque transmitting capacity of the clutch 7 continuously.

As described, in the vehicle Ve shown in FIG. 3, the engine 1 is connected to the first motor 2 in a power transmittable manner. That is, it is also possible to launch the vehicle Ve shown in FIG. 3 smoothly by the output torque of the engine 1 without using the clutch 7. For example, the output torque of the engine 1 may be delivered smoothly to the rear wheels 4 by controlling the output torque of the engine 1 by the first motor 2. However, when propelling the vehicle Ve at a very low speed e.g., at 1 km to 3 km per hour, the rear wheels 4 may be rotated at a speed different from an idling speed of the engine 1. In this situation, the output torque of the engine 1 may be delivered smoothly to the rear wheels 4 by absorbing such speed difference by the clutch 7.

The clutch 8 selectively transmits and interrupts power from the engine 1 and the first motor 4 to the rear wheels 4. To this end, in the vehicle Ve shown in FIG. 3, the clutch 8 is disposed between the clutch 7 and the rear wheels 4. As described, in the vehicle Ve shown in FIG. 3, one of the frictional engagement devices 6a of the transmission 6 serves as the clutch 8 corresponding to the "second clutch" of the embodiment.

Figure 4:
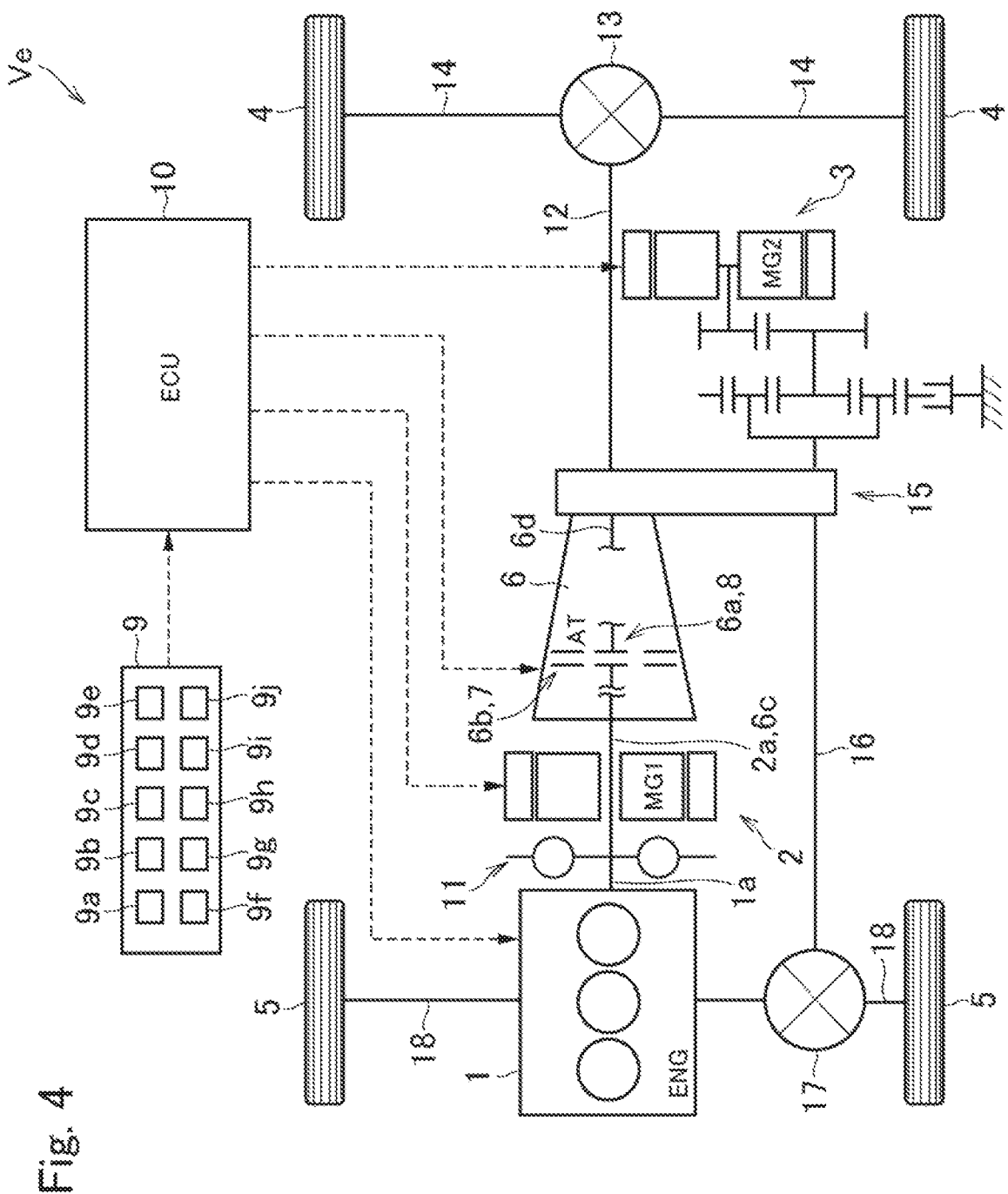
FIG. 4 is a schematic illustration showing another example of a structure of the hybrid vehicle to which the control system according to the present disclosure is applied.

Instead, as shown in FIG. 4, any one of the frictional engagement devices 6a of the transmission 6 may also serve as the "second clutch", and other one of the frictional engagement devices 6b of the transmission 6 may also serve as the starting clutch corresponding to the "first clutch". In the vehicle Ve shown in FIG. 4, therefore, the clutch 7 shown in FIG. 3 may be omitted. In FIG. 4, common reference numerals are allotted to the elements in common with those shown in FIG. 3.

The detector 9 includes sensors, devices and so on to collect various data and information relating to the vehicle Ve. For example, the detector 9 collects at least data about a speed of the output shaft 1a of the engine 1, and heat of the clutch 7 or 8. To this end, the detector 9 comprises an engine speed sensor 9a that detects a speed of the engine 1, a clutch temperature sensor 9b that detects a temperature of a friction plate (not shown) of the clutch 7 or 8, and a clutch speed sensor 9c that detects speeds of e.g., the input engagement element 7a and the output engagement element 7b of the clutch 7. Thus, the data relating the heat generation of the clutch during slipping, for example, a temperature of the clutch 7 during slipping may be collected by the clutch temperature sensor 9b. The temperature of e.g., the clutch 7 during slipping may also be estimated from an amount of heat generation calculated based on a speed difference between the input engagement element 7a and the output engagement element 7b of the clutch 7 detected by the clutch speed sensor 9c.

Specifically, the detector 9 further comprises: a motor speed sensor (or a resolver) 9d that detects a speed of each of the first motor 2 the second motor 3; a motor current sensor 9e that detects an input current to the first motor 2 and an input current to the second motor 3; a pressure sensor 9f that detects a hydraulic pressure applied to the clutch 7 and a hydraulic pressure applied to the clutch 8; a transmission speed sensor 9g that detects speeds of the input shaft 6c and the output shaft 6d of the transmission 6; an accelerator position sensor 9h that detects position of an accelerator pedal (not shown) operated by the driver; a vehicle speed sensor 9i that detects a speed of the vehicle Ve; and an acceleration sensor 9j that detects an acceleration of the vehicle Ve. The detector 9 is electrically connected to the controller 10 so that the data collected by the detector 9 is transmitted to the controller 10 in the form of electric signal.

The controller 10 comprises a microcomputer as its main constituent, and for example, the engine 1, the first motor 2, the second motor 3, the clutch 7, and the clutch 8 are controlled by the controller 10. The controller 10 performs calculation using the incident data transmitted from the detector 9, and data and formulas or the like stored in advance. Calculation results are transmitted from the controller 10 to the engine 1, the first motor 2, the second motor 3, the clutch 7 (e.g., the frictional engagement device 6b in the example shown in FIG. 4), the clutch 8 (e.g., the frictional engagement device 6a in the examples shown in FIGS. 3 and 4), and so on in the form of command signal. Although only one controller 10 is depicted in FIG. 4, a plurality of controllers may be arranged in the vehicle Ve to control the specific devices individually.

The control system according to the exemplary embodiment of the present disclosure may also be applied to an all-wheel drive layout vehicle in which a pair of front wheels 5 is driven only by an output torque of the second motor 3 without employing the transfer 15. Further, the control system according to the exemplary embodiment of the present disclosure may also be applied to a two-wheel drive layout vehicle in which the second motor 3 is connected to any one of pairs of front wheels and rear wheels without interposing the clutch 7 and the transmission 6 therebetween. Specifically, the control system may also be applied to a rear wheel-drive layout vehicle in which output torques of the engine 1 and the first motor 2 are delivered to the rear wheels 4 via the clutch 7 and the transmission 6, and an output torque of the second motor 3 is delivered directly to the rear wheels 4. Further the control system may also be applied to a front wheel-drive layout vehicle in which output torques of the engine 1 and the first motor 2 are delivered to the front wheels 5 via the clutch 7 and the transmission 6, and an output torque of the second motor 3 is delivered directly to the front wheels 5.

As described, the control system according to the exemplary embodiment of the present disclosure is configured to limit the thermal damage to the clutch without generating a shock.

Figure 5:
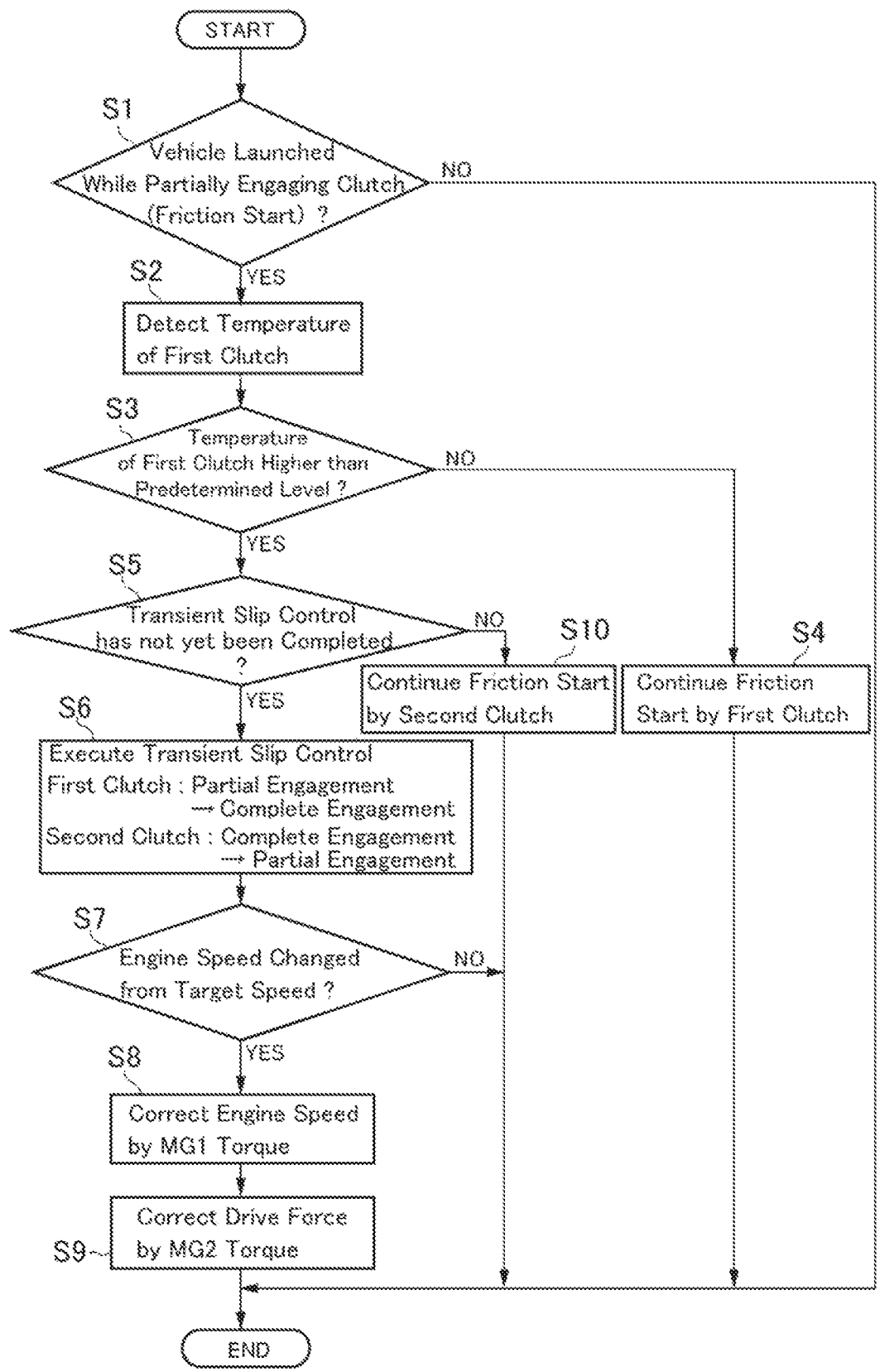
FIG. 5 is a flowchart showing one example of a routine executed by the control system according to the present disclosure.

To this end, the controller 10 is configured to execute a routine shown in FIG. 5. At step S1, it is determined whether the vehicle Ve is currently being launched while partially engaging the starting clutch. Specifically, at step S1, it is determined whether the vehicle Ve is currently being launched by a friction start while causing the clutch 7 as the first clutch to slip. For example, such determination at step S1 may be made based on the detection values of the accelerator position sensor 9h, the vehicle speed sensor 9i, the engine speed sensor 9a, the clutch speed sensor 9c.

If the vehicle Ve is not launched by the friction start so that the answer of step S1 is NO, the routine returns without carrying out any specific control.

By contrast, if the vehicle Ve is being launched by the friction start so that the answer of step S1 is YES, the routine progresses to step S2 to detect a temperature of the clutch 7. For example, the temperature of the clutch may be obtained based on a detection value of the clutch temperature sensor 9b. Instead, the temperature of the clutch may also be estimated may also be estimated from a theoretical amount of heat generation of the clutch 7 calculated based on a speed difference between the input engagement element 7a and the output engagement element 7b of the clutch 7 detected by the clutch speed sensor 9c.

Then at step S3, it is determined whether the temperature of the clutch 7 is equal to or higher than a predetermined threshold level. Specifically, such predetermined level is a cautionary temperature level determined based on a result of a driving test or simulation. If the temperature of the clutch 7 is lower than the cautionary temperature level, this means that the clutch 7 will not be overheated. By contrast, if the temperature of the clutch 7 is equal to or higher than the cautionary temperature level, an occurrence of overheating of the clutch 7 is expected. As indicated in the time chart shown in FIG. 6, according to the exemplary embodiment of the present disclosure, an unacceptable temperature level as an upper limit temperature level of the clutch 7 is also set to prevent the overheating of the clutch 7. Specifically, the controller 10 is configured to execute the above-mentioned transient slip control in such a manner that the temperature of the clutch 7 will not exceed the unacceptable temperature level.

If the temperature of the clutch 7 is lower than the cautionary temperature level so that the answer of step S3 is NO, the routine progresses to step S4 to continue the friction start while causing the clutch 7 to slip.

In this case, it is not necessary to execute the transient slip control so as to protect the clutch 7, and hence the friction start while slipping the clutch 7 is continued.

By contrast, if the temperature of the clutch 7 is equal to or higher than the cautionary temperature level so that the answer of step S3 is YES, the routine progresses to step S5 to determine whether the transient slip control has not yet been completed.

In this case, if the transient slip control has not yet been commenced, the answer of step S5 will be YES, and the routine progresses to step S6 to execute the transient slip control of the clutch 7 and the clutch 8.

Figure 6:
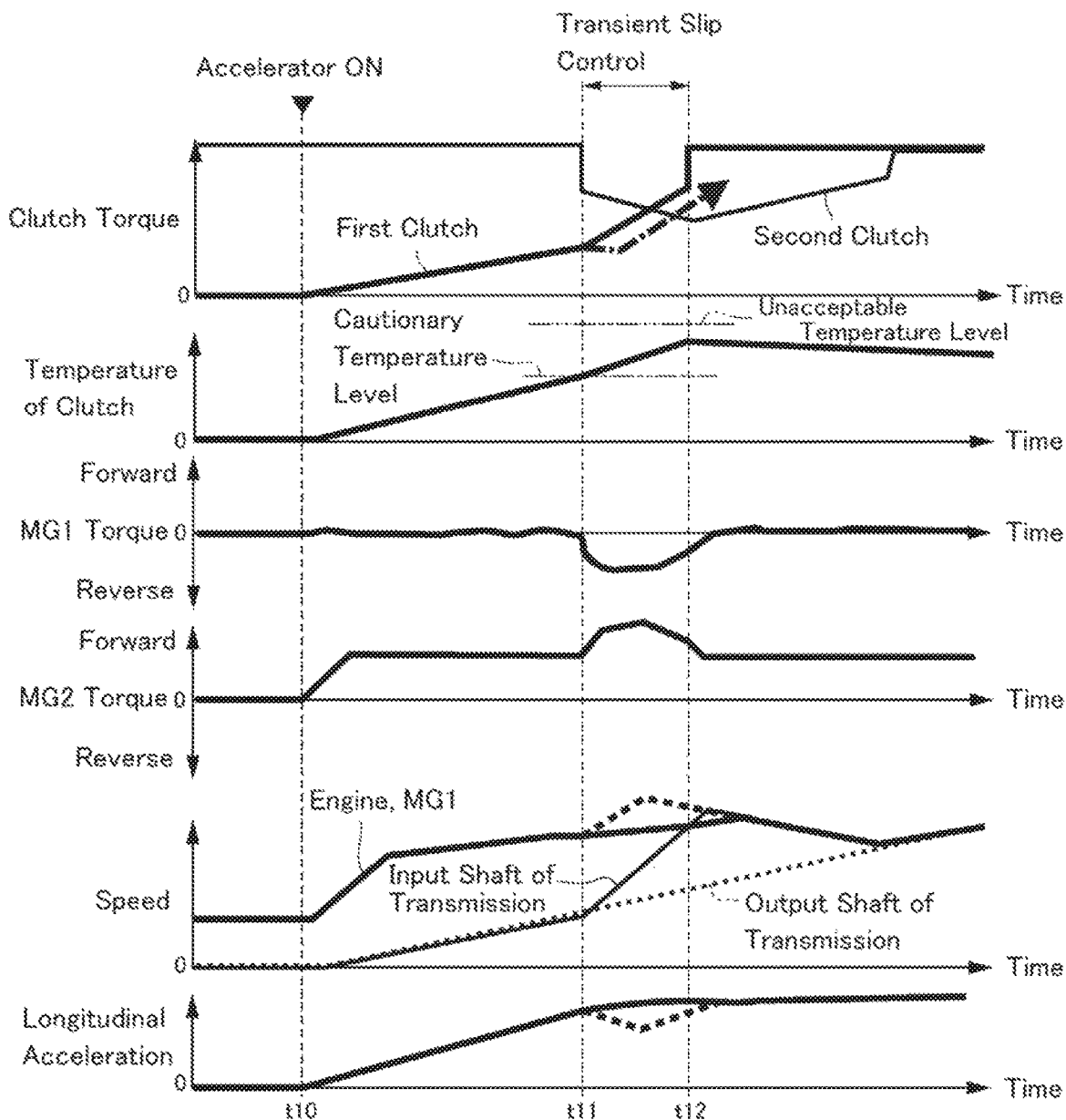
FIG. 6 is a time chart indicating one example of temporal changes in conditions of the hybrid vehicle during execution of the transient slip controls of the clutches.

Details of the transient slip control is shown in FIG. 6. At point t10, the accelerator pedal is depressed so that the friction start is commenced. Consequently, the clutch 7 is engaged partially while slipping, and a torque transmitting capacity of the clutch 7 is increased gradually. When the temperature of the clutch 7 reaches the cautionary temperature level at point t11, the transient slip control of the clutch 7 and the clutch 8 is commenced. Consequently, the clutch 8 in complete engagement is caused to slip from point t11 so that a torque transmitting capacity of the clutch 8 is reduced gradually from point t11 to point t12. At the same time, the torque transmitting capacity of the clutch 7 is further increased at a higher rate from point t11, and the torque transmitting capacity of the clutch 7 is increased to the maximum value at point t12. That is, the clutch 7 is brought into complete engagement at point t12.

By thus reducing the torque transmitting capacity of the clutch 8 temporarily from point t11, an increasing rate of the torque transmitting capacity of the clutch 7 can be increased from point t11 without changing the speed of the engine 1 abruptly, and hence the clutch 7 can be brought into complete engagement earlier at point t12. For this reason, an amount of heat generation in the clutch 7 can be reduced to prevent an occurrence of overheating of the clutch 7.

Optionally, the transient slip control of the clutch 7 may be executed in such a manner that an actual torque transmitting capacity of the clutch 7 increased with respect to an ideal torque transmitting capacity of the clutch 7 slipping in an ideal condition in which the speed of the engine 1 will not be changed unnaturally. The torque transmitting capacity of the clutch 7 slipping in an ideal condition may be found based on a result of a driving test or simulation.

Turning back to FIG. 6, it is determined at step S7 whether an actual speed of the engine 1 detected by the engine speed sensor 9a is changed unnaturally from a target speed more than a predetermined value. The predetermined value is a threshold value to determine a change in the speed of the engine 1, and may be set based on a result of a driving test or simulation. For example, if the actual speed of the engine 1 is deviated from the target speed more than the predetermined value, that is, if an absolute value of a difference between the actual speed and the target speed of the engine 1 is greater than the predetermined value, it is necessary to correct the speed of the engine 1 by the first motor 2. By contrast, if the absolute value of the difference between the actual speed and the target speed of the engine 1 is less than the predetermined value, it is not necessary to correct the speed of the engine 1 by the first motor 2.

If the absolute value of the difference between the actual speed and the target speed of the engine 1 is less than the predetermined value so that the answer of step S7 is NO, the routine returns. By contrast, if the absolute value of the difference between the actual speed and the target speed of the engine 1 is equal to or greater than the predetermined value so that the answer of step S7 is YES, the routine progresses to step S8 to correct the speed of the engine 1 by an output torque of the first motor 2.

Figure 1:
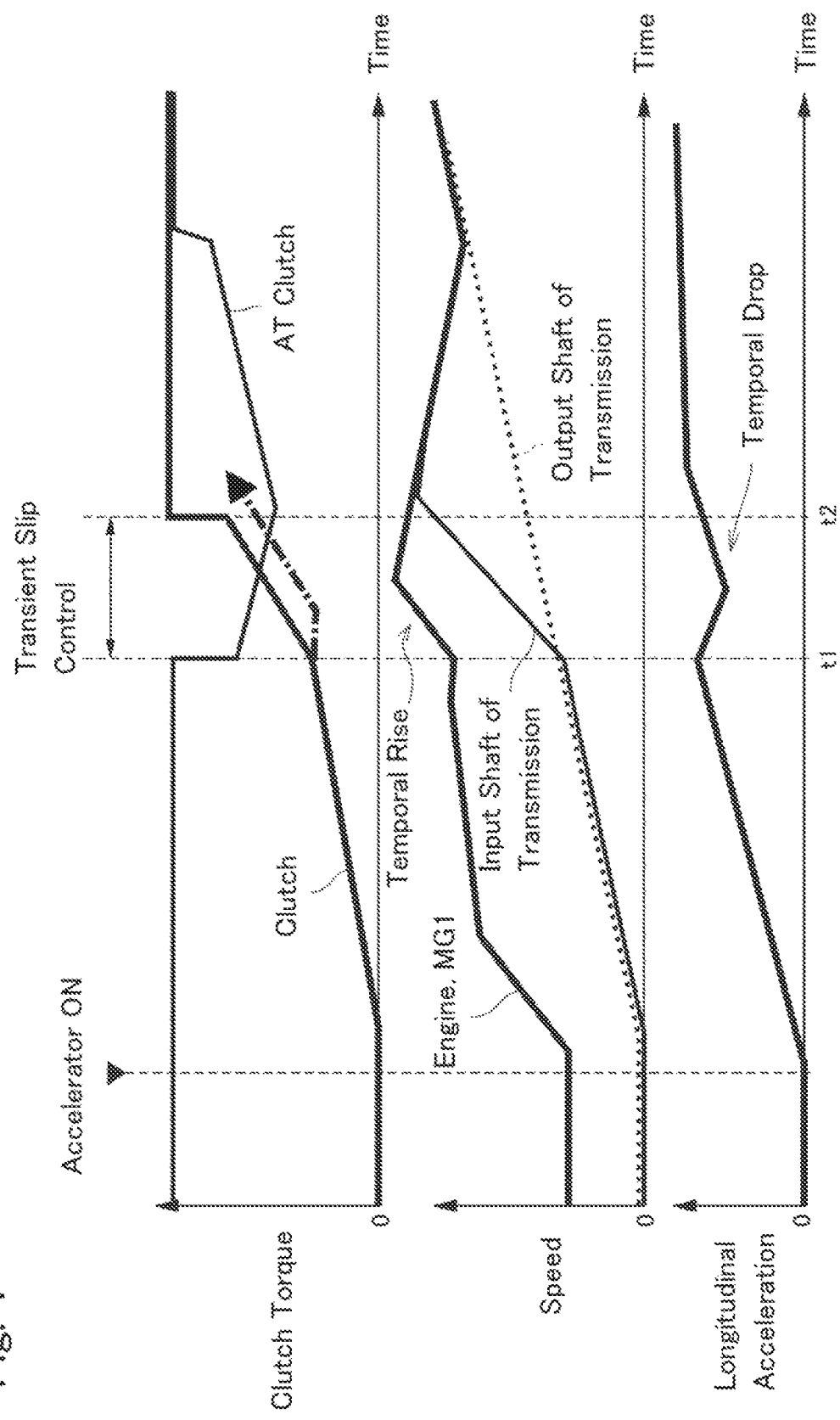
FIG. 1 is a time chart indicating one example of temporal changes in a speed of the prime mover and an acceleration of a vehicle during execution of the transient slip control by the conventional method.
Figure 2:
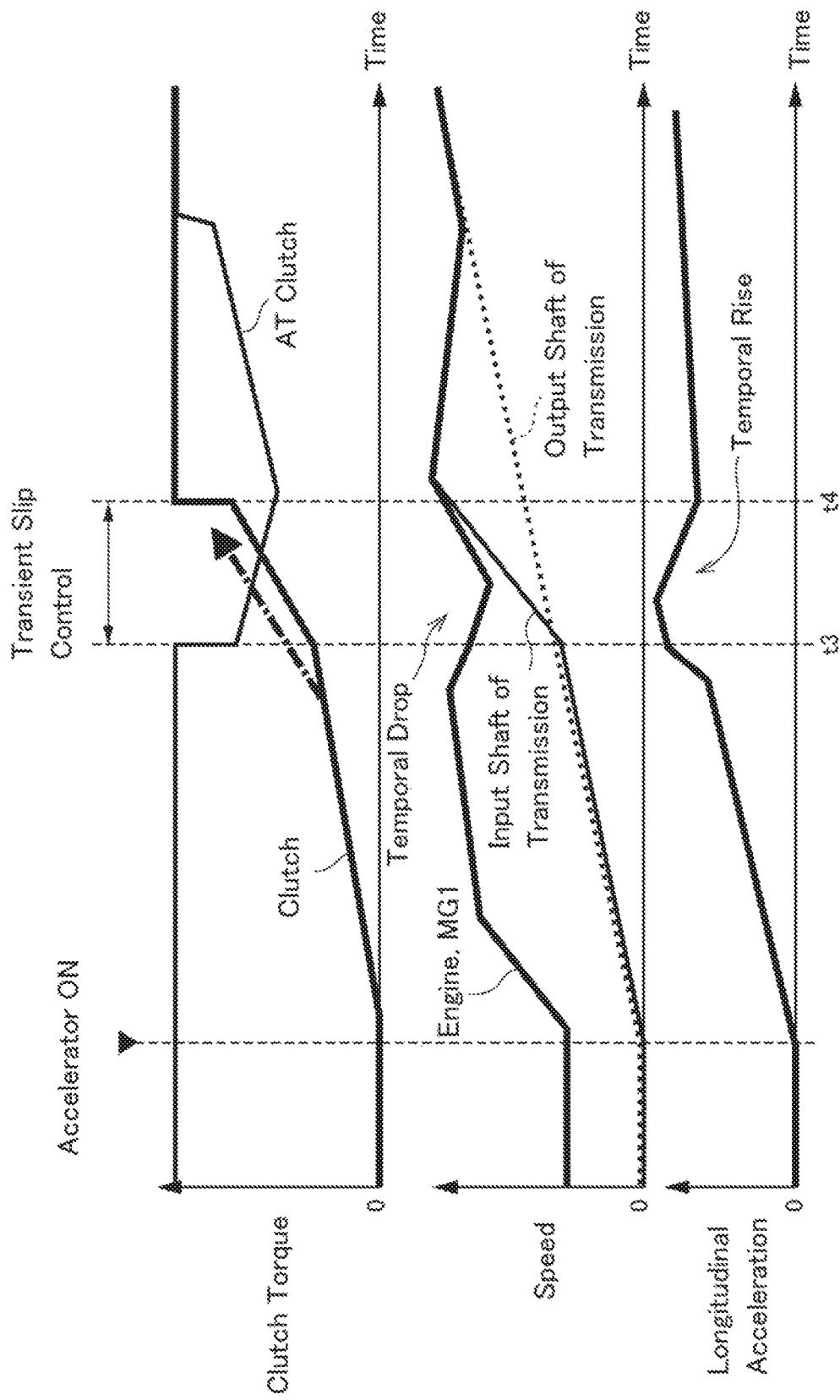
FIG. 2 is a time chart indicating another example of temporal changes in a speed of the prime mover and an acceleration of a vehicle during execution of the transient slip control by the conventional method.

As described with reference to FIGS. 1 and 2, according to the conventional transient slip control, a timing of switching engagement states of the clutches may be shifted undesirably, and actuation amounts of the of the clutches may be changed inevitably due to response delay in the hydraulic system. According to the conventional transient slip control, therefore, a speed of the engine may be increased or reduced abruptly. On the other hand, according to the exemplary embodiment of the present disclosure, the speed of the engine 1 is adjusted by the first motor 2 if it is changed undesirably as a result of executing the transient slip control of the clutches.

For example, in a case that the actual torque transmitting capacity of the clutch 7 indicated by the dashed-dotted line in FIG. 6 is reduced with respect to an ideal torque transmitting capacity indicated by the solid line in FIG. 6 during execution of the transient slip control from point t11 to point t12, the speed of the engine 1 is increased temporarily. In this case, according to the exemplary embodiment of the present disclosure, such temporal rise in the speed of the engine 1 is suppressed by generating a negative (or reverse) correction torque by the first motor 2. For example, such temporal rise in the speed of the engine 1 may be suppressed by controlling the correction torque of the first motor 2 by a feedback method based on a detected value of the change in the speed of the engine 1.

Figure 7:
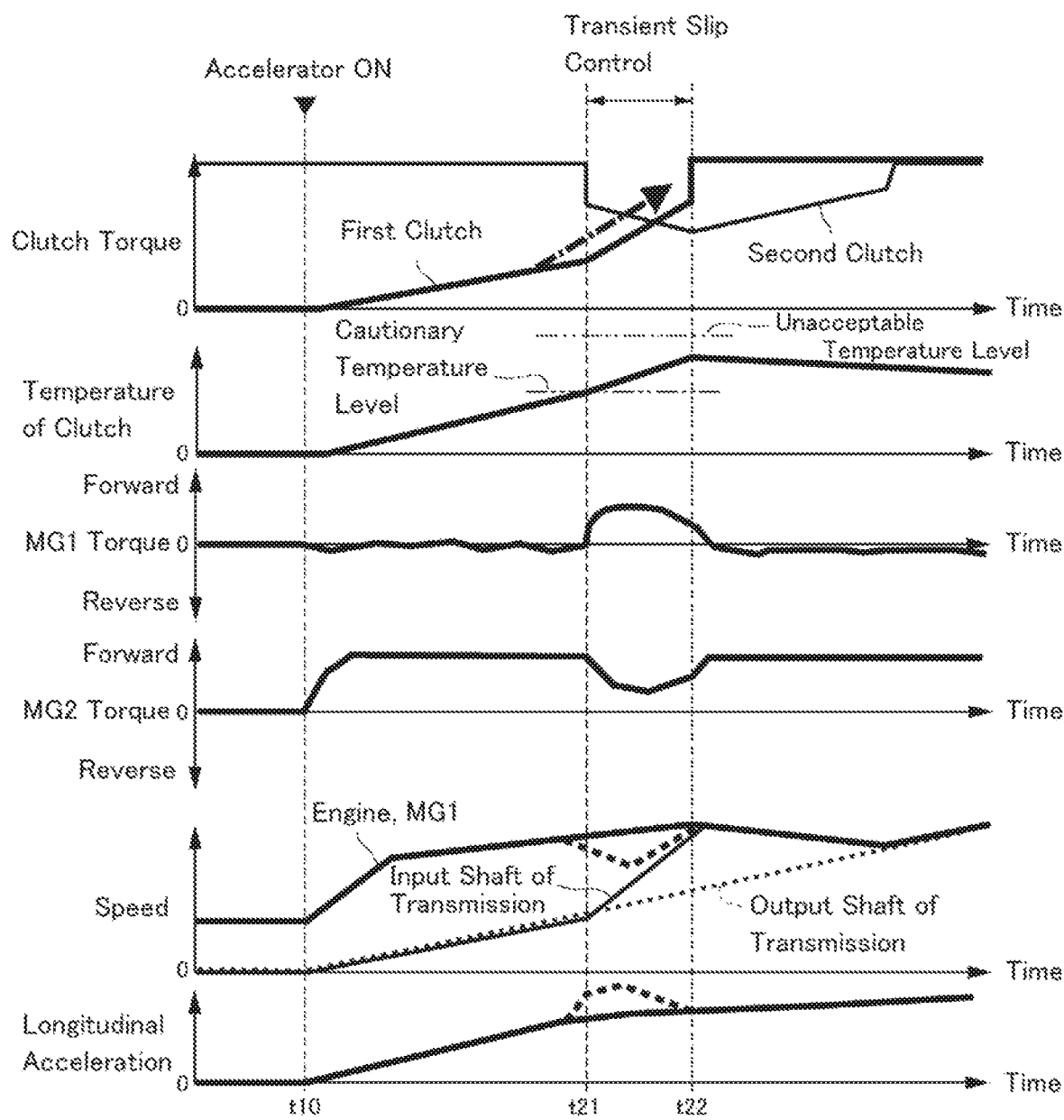
FIG. 7 is a time chart indicating another example of temporal changes in conditions of the hybrid vehicle during execution of the transient slip controls of the clutches.

Turning to FIG. 7, there is shown an example in which the actual torque transmitting capacity of the clutch 7 indicated by the dashed-dotted line is increased with respect to the ideal torque transmitting capacity indicated by the solid line during execution of the transient slip control from point t21 to point t22. In this case, the speed of the engine 1 is reduced temporarily. According to the exemplary embodiment of the present disclosure, such temporal reduction in the speed of the engine 1 is suppressed by generating a positive (or forward) correction torque by the first motor 2. For example, such temporal reduction in the speed of the engine 1 may also be suppressed by controlling the correction torque of the first motor 2 by the feedback method based on a detected value of the change in the speed of the engine 1.

Turning back to FIG. 5, at step S9, the drive force to propel the vehicle Ve is corrected by an output torque of the second motor 3. As a result of correcting the speed of the engine 1 by the output torque of the first motor 2, the drive force delivered from the engine 1 and the first motor 2 to the rear wheels 4 may be changed. According to the exemplary embodiment of the present disclosure, therefore, such undesirable change in the drive force is suppressed by controlling the second motor 3.

Specifically, in the case of correcting the speed of the engine 1 raised temporarily by the negative correction torque of the first motor 2 as indicated in FIG. 6, the second motor 3 generates a counter torque (i.e., a positive torque) against the negative correction torque of the first motor 2. Specifically, the second motor 3 generates a torque of a same magnitude as the negative correction torque of the first motor 2 in the counter direction to the negative correction torque of the first motor 2. Consequently, such change in the drive force resulting from generating the negative correction torque by the first motor 2 may be balanced out.

By contrast, in the case of correcting the speed of the engine 1 reduced temporarily by the positive correction torque of the first motor 2 as indicated in FIG. 7, the second motor 3 also generates a counter torque (i.e., a negative torque) against the positive correction torque of the first motor 2. Specifically, the second motor 3 generates a torque of a same magnitude as the positive correction torque of the first motor 2 in the counter direction to the positive correction torque of the first motor 2. Consequently, such change in the drive force resulting from generating the positive correction torque by the first motor 2 may be balanced out.

Figure 8:
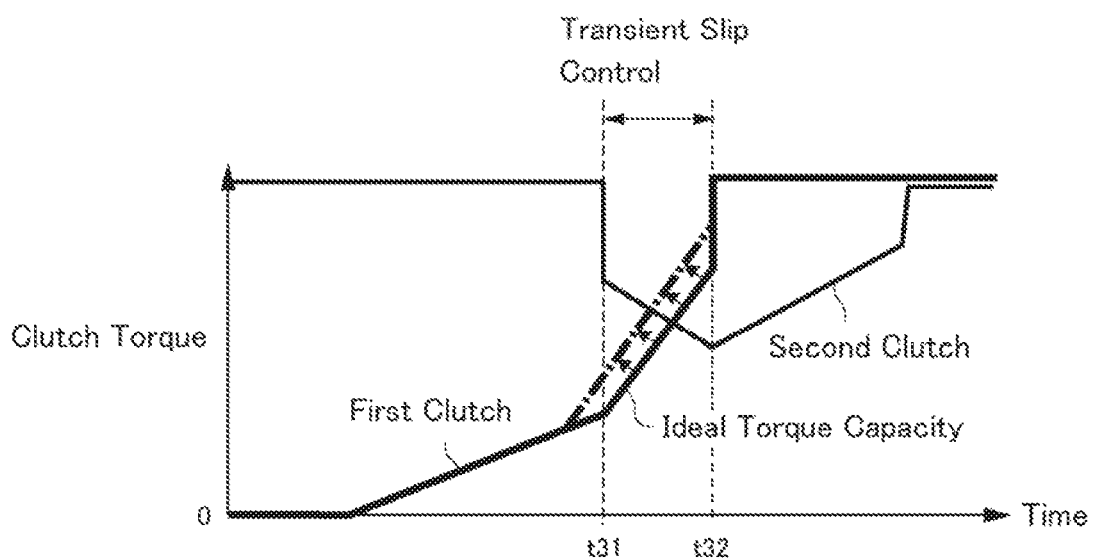
FIG. 8 is a time chart showing an example of increasing a torque transmitting capacity of the first clutch with respect to an ideal torque transmitting capacity during execution of the transient slip control of the clutches.

The second motor 3 is mainly used under the high load to launch and accelerate the vehicle Ve by generating the positive torque, therefore, the positive torque of the second motor 3 may be restricted when reaches an upper limit. However, the second motor 3 is allowed to generate the negative torque without restriction to counteract to the positive correction torque of the first motor 2. Therefore, as shown in FIG. 8, the transient slip control of the clutch 7 and the clutch 8 may be executed at step S6 in such a manner as to increase the torque transmitting capacity of the clutch 7 indicated by the dashed-dotted line is increased with respect to the ideal torque transmitting capacity indicated by the solid line during execution of the transient slip control from point t31 to point t32. In this case, as indicated by the dashed line in FIG. 7, the speed of the engine 1 is most probably reduced from the target speed during execution of the transient slip control. Consequently, the second motor 3 is allowed to generate the counter torque in the negative direction to counteract to the positive correction torque generated by the first motor 2.

In this case, therefore, change in the drive force to propel the vehicle Ve and change in the acceleration of the vehicle Ve resulting from correcting the speed of the engine 1 by the first motor 2 may be suppressed certainly by generating the negative torque by the second motor 3 without restriction.

Turning back to FIG. 5, after correcting the drive force by the second motor at step S9, the routine terminates.

If the transient slip control has been completed so that the answer of step S5 is NO, the routine progresses to step S10 to continue the friction start while causing the clutch 8 to slip.

In this situation, the transient slip control of the clutch 7 has been completed and the clutch 7 is in complete engagement. Therefore, the friction start is continued while causing the clutch 8 to slip instead of the clutch 7.

Thus, according to the exemplary embodiment of the present disclosure, the transient slip control of the clutch 7 and the clutch 8 is executed when the temperature of the clutch 7 is raised to the predetermined level during launching the vehicle Ve by the friction start. Then, after completion of the transient slip control, the friction start is continued while causing the clutch 8 to slip. According to the exemplary embodiment of the present disclosure, therefore, the vehicle Ve may be launched smoothly by the friction start without causing overheating of the clutch 7.

After continuing the friction start while slipping the clutch 8 at step S10, the routine terminates.

Thus, according to the exemplary embodiment of the present disclosure, the transient slip control of the first clutch and the second clutch is executed to limit thermal damage to the first clutch when the temperature of the first clutch is raised to the predetermined level during launching the vehicle Ve by the friction start. During execution of the transient slip control, if the difference between the actual speed and the target speed of the engine 1 is increased greater than the predetermined value, the speed of the engine 1 is corrected by the correction torque of the first motor 2. According to the exemplary embodiment of the present disclosure, therefore, the speed of the engine 1 will not be changed undesirably so that the vehicle Ve launched smoothly without generating shock.

As described, the drive force to propel the vehicle Ve and the acceleration of the vehicle Ve may be changed as a result of correcting the speed of the engine 1 by the correction torque of the first motor 2 during execution of the transient slip control of the clutches 7 and 8. In order to suppress such change in the drive force and the acceleration, according to the exemplary embodiment of the present disclosure, the second motor 3 generates the counter torque against the correction torque of the first motor 2. According to the exemplary embodiment of the present disclosure, therefore, overheating of the first clutch may be prevented and the vehicle Ve is allowed to launch smoothly without generating shock. In other words, the first clutch can be protected while improving driving comfort when launching the vehicle Ve.

Although the above exemplary embodiments of the present disclosure have been described, it will be understood by those skilled in the art that the present disclosure should not be limited to the described exemplary embodiments, and various changes and modifications can be made within the scope of the present disclosure. For example, the clutch 8 shown in FIG. 3 may also be used as the first clutch and the clutch 7 shown in FIG. 3 may also be used as the second clutch to launch the vehicle Ve by the friction start. Likewise, the clutch 8 shown in FIG. 4 may also be used as the first clutch and the clutch 7 shown in FIG. 4 may also be used as the second clutch to launch the vehicle Ve by the friction start. In those cases, the thermal damage to the first clutch may also be limited by executing the routine shown in FIG. 5.

What is claimed is:

1. A control system for a hybrid vehicle comprising:
an engine;
a first motor that is connected to an output shaft of the engine in a power transmittable manner;
a first clutch that selectively transmits power from the engine and the first motor to a pair of drive wheels, and that is adapted to be engaged partially while slipping to vary a torque transmitting capacity continuously;
a second clutch that selectively transmits the power from the engine and the first motor to the pair of drive wheels, and that is adapted to be engaged partially while slipping to vary a torque transmitting capacity continuously;
a second motor that is connected to the pair of drive wheels without interposing the engine and the first motor therebetween;
a detector that collects at least data relating to a heat of the first clutch, and a speed of the engine; and
a controller that controls the engine, the first clutch, the second clutch, the first motor, and the second motor,
wherein the controller is configured to
obtain a temperature of the first clutch based on the data relating to the heat of the first clutch when engaging the first clutch completely while causing the first clutch to slip,
execute a transient slip control to cause the second clutch to slip while bringing the slipping first clutch into complete engagement if the temperature of the first clutch is higher than a predetermined level,
generate a collection torque to suppress a change in a speed of the engine by the first motor, if the speed of the engine is changed from a target speed more than a predetermined value during execution of the transient slip control, and
operate the second motor to generate a torque counteracting against the collection torque generated by the first motor.

2. The control system for the hybrid vehicle as claimed in claim 1, wherein the controller is further configured to execute the transient slip control in such a manner that the torque transmitting capacity of the first clutch is increased with respect to an ideal torque transmitting capacity of the first clutch given that the first clutch is engaged partially in an ideal condition in which the speed of the engine will not be changed.

3. The control system for the hybrid vehicle as claimed in claim 2, wherein the controller is further configured to
execute a friction start to launch the hybrid vehicle by delivering at least an output torque of the engine to the pair of drive wheels while causing the first clutch or the second clutch to slip,
execute the transient slip control if the temperature of the first clutch is raised higher than the predetermined level during execution of the friction start, and
continue the friction start while causing the second clutch to slip after engaging the first clutch completely.

4. The control system for the hybrid vehicle as claimed in claim 1, wherein the controller is further configured to
execute a friction start to launch the hybrid vehicle by delivering at least an output torque of the engine to the pair of drive wheels while causing the first clutch or the second clutch to slip,
execute the transient slip control if the temperature of the first clutch is raised higher than the predetermined level during execution of the friction start, and
continue the friction start while causing the second clutch to slip after engaging the first clutch completely.

* * * * *